United States Patent [19]

Plummer

[11] 4,251,146
[45] Feb. 17, 1981

[54] PHOTOGRAPHIC APPARATUS FOR PROVIDING A SIGNAL VISIBLE IN A CAMERA VIEWFINDER

[75] Inventor: William T. Plummer, Concord, Mass.
[73] Assignee: Polaroid Corporation, Cambridge, Mass.
[21] Appl. No.: 7,043
[22] Filed: Jan. 29, 1979
[51] Int. Cl.³ .................. G03B 7/08; G03B 17/20; G03B 19/12
[52] U.S. Cl. .................. 354/53; 354/60 L; 354/155; 354/289
[58] Field of Search .................. 354/53–57, 354/60 L, 155, 219, 289, 198, 220–225; 352/171

[56] References Cited

U.S. PATENT DOCUMENTS

| | | | |
|---|---|---|---|
| 3,416,867 | 12/1968 | Biber | 356/230 |
| 3,518,926 | 7/1970 | Bing | 354/42 |
| 3,583,300 | 6/1971 | Johnson et al. | 354/219 |
| 3,714,879 | 2/1973 | Land et al. | 354/155 X |
| 3,791,273 | 2/1974 | Beach | 354/53 |
| 3,996,593 | 12/1976 | Uno et al. | 354/43 |
| 4,001,843 | 7/1974 | Ellin | 354/23 D |
| 4,007,469 | 2/1977 | Land et al. | 354/27 |
| 4,016,576 | 4/1977 | Nomura | 354/55 |
| 4,021,830 | 5/1977 | Kanno | 354/225 |
| 4,034,392 | 7/1977 | Ishizaka et al. | 354/289 |

Primary Examiner—L. T. Hix
Assistant Examiner—Thomas H. Tarcza
Attorney, Agent, or Firm—Francis J. Caufield

[57] ABSTRACT

Photographic indicator apparatus is provided for use in a folding type camera with a collapsible viewing device to provide a signal which is visible through an eyelens of the camera viewing device and which indicates that available scene light is below a threshold value which requires the use of an artificial light source to provide supplemental illumination of the scene or which will cause blurred pictures if the camera is hand held and no artificial light source is used. The low available scene light signal originates from an LED which is made visible through the eyelens by a specially configured prismatic optical element that defines a deviated optical path between the eyelens and the LED.

11 Claims, 6 Drawing Figures

PHOTOGRAPHIC APPARATUS FOR PROVIDING A SIGNAL VISIBLE IN A CAMERA VIEWFINDER

BACKGROUND OF THE INVENTION

1. Field of the Invention

This invention in general relates to photographic camera indicator apparatus and, more specifically, to a low scene light indicating arrangement which is particularly suitable for use with folding cameras having collapsible type viewing devices.

2. Description of the Prior Art

Photographic indicator apparatus for visually displaying various kinds of information in the field of view of a camera viewfinder to simplify camera operation and aid the photographer in obtaining sharp, properly exposed pictures are well-known in the photographic arts. Examples of the kind of information displayed include exposure values, exposure meter needles and corresponding scales, f-numbers and/or shutter speeds, matching needle exposure meters, signals indicating the existence of low available light conditions, and the like. With such information readily observable by the photographer prior to or while he is composing the content of the picture, the overall convenience of the picture taking process is markedly improved since the number of camera manipulations is generally reduced, and the reliability of obtaining quality photographs is also enhanced since the photographer can view essential camera and scene information superimposed more or less exactly on the scene of interest.

The structure and operation of apparatus by which visual information can be displayed in a camera viewfinder in general appears to depend on such factors as the nature of the camera exposure control system (automatic vs. manual); the type of viewfinder utilized (through-the-lens or independent); what information is considered essential for the operation of the particular camera; the form in which the information is available; and where the information is located in the camera in relation to where it can be seen.

For example U.S. Pat. No. 4,034,392, issued to Sunao Ishizaka et al. on July 5, 1977 and entitled "Exposure Indicator Device In A Single Lens Reflex Camera With A TTL Exposure Meter Contained Therein", discloses a single lens reflex camera having an optical arrangement which includes a pentaprism and a prismatic element associated therewith for providing an exposure indication visible within the field of view of the camera finder.

Other apparatus which are similar to *Ishizaka et al.* in that pentaprism type finders are utilized in combination with prismatic elements to display aperture or exposure values are described in U.S. Pat. No. 4,016,576 issued to Katsuhiko Nomura on Apr. 5, 1977; U.S. Pat. No. 4,021,830 issued to Kyusei Kanno on May 3, 1977; and U.S. Pat. No. 3,996,593 issued to Naoyuki Uno et al. on Dec. 7, 1976.

Another example of such apparatus is described in U.S. Pat. No. 3,583,300 issued to Bruce K. Johnson et al. on June 8, 1971 and entitled "Photographic Camera With Viewfinder". In *Johnson et al.* a camera is disclosed which has an independent, reversed Galilean type viewfinder and an associated periscope like arrangement whereby a distance focusing scale located on a manually rotatable lens bezel can be seen by a photographer as he views a scene.

However, none of the known viewfinder display arrangements of the prior art appear to solve the problem with which the present invention is concerned. In particular, the primary object of the present invention is to provide photographic apparatus that is particularly suitable for providing in a collapsible type viewing device of a folding reflex camera a visual indication that the available scene light is below a threshold value which normally requires the use of an artificial light source.

Other objects of the invention will in part be obvious and will in part appear hereinafter. The invention accordingly comprises the apparatus possessing the construction, combination of elements and arrangement of parts which are exemplified in the following detailed disclosure.

SUMMARY OF THE INVENTION

This invention relates to photographic camera apparatus for providing a visual signal to a photographer that available scene light is below a threshold value which normally requires an artificial light source to illuminate the scene.

The apparatus of the invention comprises a camera housing including at least one section having a forward wall which generally faces the scene and a rear wall which generally faces the photographer when the camera is held in its normal picture taking attitude.

Also included is an objective taking lens which is centrally disposed in the forward wall of the one housing section for forming an image of a scene to be photographed.

Light detecting means for measuring the level of available scene light and providing a visual signal that the available scene light is below a threshold value which normally requires an artificial light source to illuminate a scene are also provided. The light detecting and signal providing means include a photodetector mounted with respect to the forward wall of the one housing section and to one side of the objective taking lens and a light emitting device mounted generally behind the photodetector and arranged to provide the visual signal from the rear of the one housing section.

In addition, optical means, including an eyelens spaced rearwardly of the one housing section are included for viewing the scene to be photographed. The eyelens and the light emitting device are configured and arranged with respect to one another so that there is a point intermediate the eyelens and the light emitting device from which there is a direct line of sight to both the eyelens and the light emitting device but so that no direct line of sight between the eyelens and the light emitting device exists.

A prismatic optical element is also included and is mounted generally at the intermediate point for providing a deviated optical path along which the light emitting device visual signal can be observed by a photographer through the eyelens while viewing a scene to be photographed.

An important feature of the invention is that the prismatic optical element is mounted forward of the eyelens and offset to one side of the eyelens optical axis which side is opposite to the side of the front housing section adjacent which the light emitting device is positioned and is optically configured so that the deviated optical path comprises one leg from the prismatic optical element to the light emitting device which is skewed with respect to the light emitting device and the prismatic optical element and another leg between the prismatic optical element and the eyelens which is skewed with respect to the prismatic optical element and the eyelens.

Preferably the prismatic optical element comprises an oblique quadrangular prism formed of an optical plastic material.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

Figure 1:
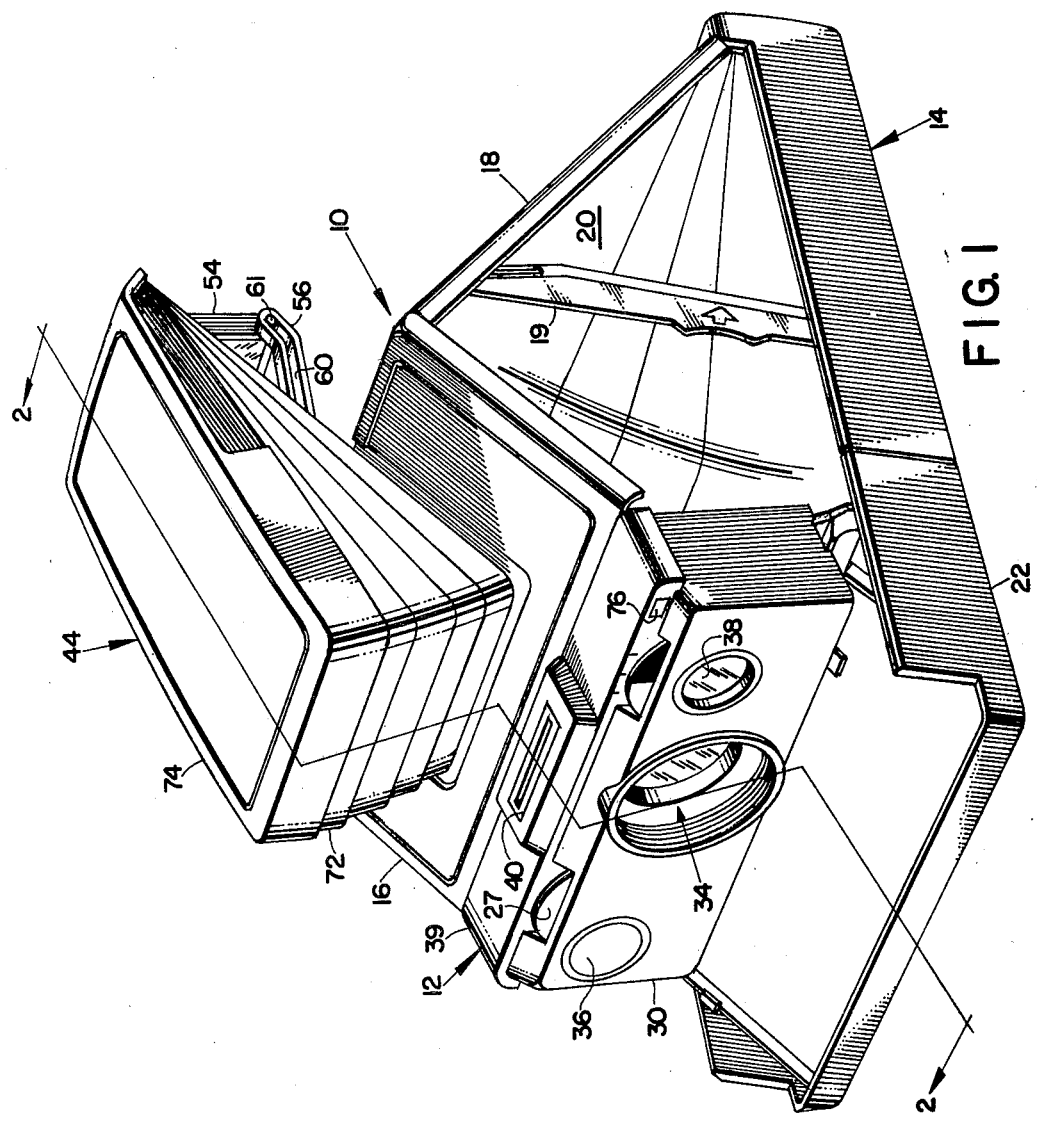
FIG. 1 is a front perspective view of a folding type camera in which features of the present invention are incorporated.
Figure 2:
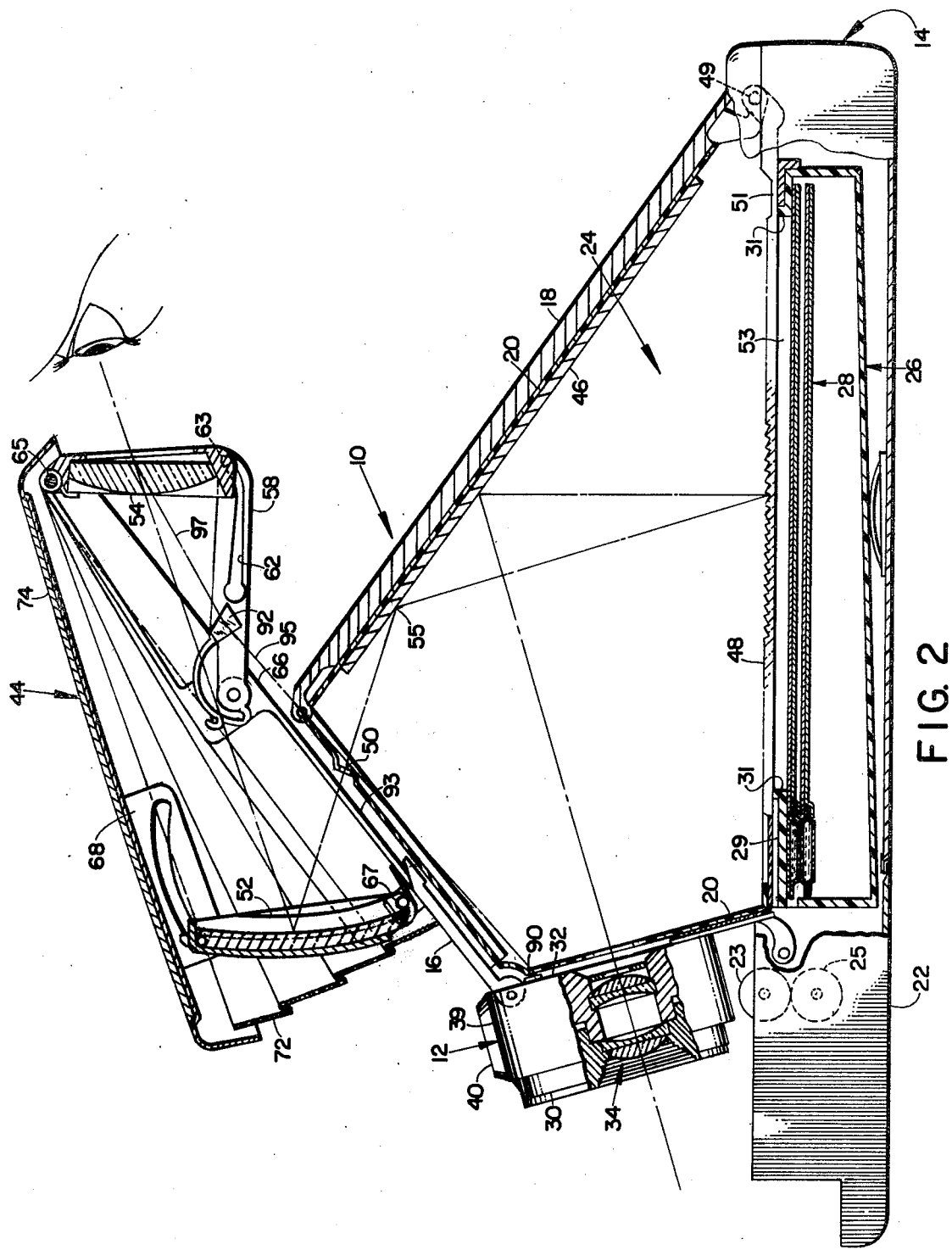
FIG. 2 is a cross-sectional view of the camera of FIG. 1 taken generally along line 2—2 of FIG. 1.
Figure 3:
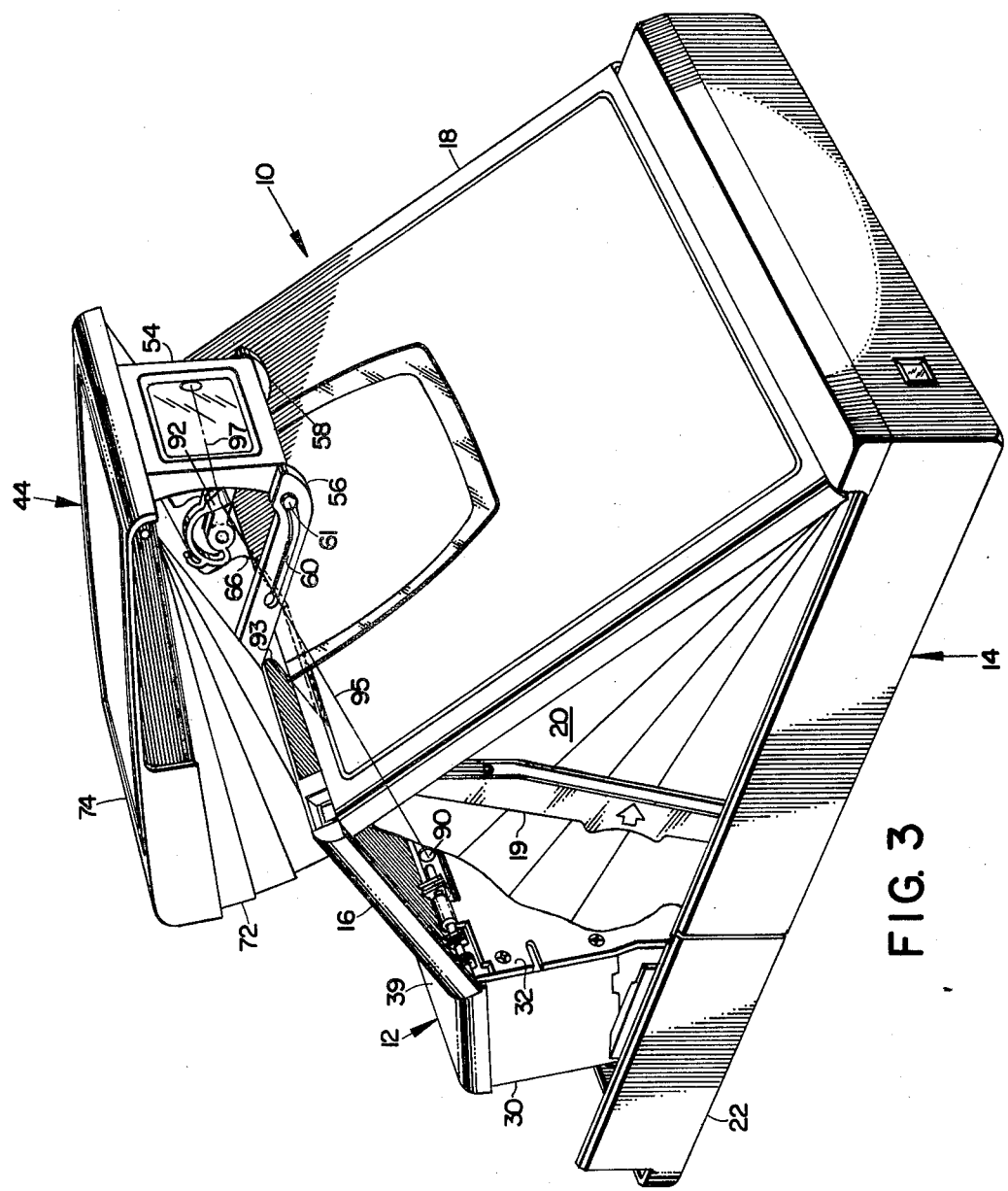
FIG. 3 is a rear perspective view of the camera of FIG. 1.

A camera 10 of the type in which the preferred embodiment of the present invention is particularly useful is shown in FIGS. 1, 2 and 3. The camera 10 may be generally characterized as a fully automatic, folding, reflex type which utilizes self-processable type film units. Camera 10 is provided in a well-known manner with a viewing and focusing mode of operation during which a photographer may compose and focus the subject matter that he selects for inclusion in the picture and an exposure and processing mode of operation, which follows the viewing and focusing mode during which a film unit is automatically exposed and thereafter processed in a well-known manner. Also, the photographer may choose between two distinct exposure modes of operation when using the camera 10. In one mode, an ambient exposure mode, the camera 10 operates to utilize available scene light for exposing a film unit and in another mode, a flash exposure mode of operation, the camera 10 utilizes an artificial light source, such as a linear photoflash lamp array or an electronic strobe, to illuminate the scene. In the flash exposure mode of operation, the light from the artificial source supplements the available scene light raising it to a level where the speed at which the camera automatic shutter operates is fast enough to eliminate blurred pictures which may result from camera motion.

In general, the camera 10 has structural and operating features similar to those of the camera disclosed and described in considerable detail in U.S. Pat. No. 3,714,879 issued to Edwin H. Land et al. on Feb. 6, 1973 and entitled "Reflex Camera". However, the camera 10 specifically differs from the Land et al. camera, supra, by virtue of a novel photographic apparatus for providing a visual signal to a photographer that the available scene light is below a threshold value which normally requires an artificial light source to illuminate the scene. Therefore, only those features of the camera 10 which are considered essential for an understanding of the present invention will be given, and for those which are identified as well-known, reference may be had to the above-mentioned U.S. Pat. No. 3,714,879 or to other U.S. Patents which will be specifically identified where appropriate.

FIGS. 1, 2, and 3 illustrate the camera 10 in a fully-extended, operative condition wherein it can be seen that the camera 10 comprises a plurality of housing sections including a shutter housing section 12, a base housing section 14, an upper housing section 16, and a rear housing section 18 which are pivotally coupled together for relative movement with respect to one another. The four housing sections, 12, 14, 16, and 18, thus arranged, cooperate to form a four-sided articulated structure or support frame for supporting a film container and components of the camera's optical and exposure systems in a predetermined spatial arrangement when the camera 10 is erected as shown in FIGS. 1, 2, and 3. Structurally arranged in this manner, the four housing sections, 12, 14, 16, and 18, provide the camera 10 with a foldable housing which, in effect operates as a four-bar linkage system which is geometrically configured to define a predetermined space between them when the camera 10 is erected and are further configured and arranged with respect to one another to provide the camera 10 with a compact folded shape (not shown) to facilitate its transport and storage.

The camera 10 is maintained in its fully extended position in a well-known manner by the provision of an erecting link 19. The erecting link 19 locks the housing sections, 12, 14, 16, and 18, in their predetermined spatial relationship to preserve the geometric integrity of the camera 10 while in its extended position. The erecting link 19 may be manually moved in a well-known manner so as to interrupt the locking relationship between the housing sections, 12, 14, 16, and 18, in order to facilitate folding the camera 10.

Secured to the interior walls of the housing sections, 12, 14, 16, and 18, is a thin-walled, opaque flexible envelope 20 which is configured and arranged for movement in correspondence therewith between a collapsed state (not shown) corresponding to the folded position of the camera 10 wherein the envelope 20 also assumes a compact shape to facilitate folding the camera 10 and the extended state as illustrated in FIGS. 1, 2 and 3. When the camera 10 is in its extended state, the envelope 20 is extended to define, in cooperation with the housing sections, 12, 14, 16, and 18, a light-tight exposure chamber which is generally designated at 24 in FIG. 2.

The base housing section 14 is adapted in a well-known manner to receive and hold a film cassette 26 (see FIG. 2) in position so that photosensitive film components contained therein can be exposed. The film cassette 26 is preferably of the type which includes a stacked array of self-processable type film units which are designated generally at 28. Located in the base of the film cassette 26, underneath the stacked array of self-processable film units 28, is a rectangular flat, thin battery (not shown) which can be used in a well-known manner to supply power to the various electrical components of the camera 10. Located in a forward or upper wall 29 of the film cassette 26 is a film format aperture 31 the peripheral edges of which generally define the photosensitive areas of the film units 28 which can be exposed. An example of such a film cassette is disclosed and described in considerable detail in U.S. Pat. No. 3,872,487 issued to Nicholas Gold on Mar. 18, 1975 and entitled "Photographic Film Assemblage and Apparatus".

Extending forwardly of the base housing section 14 is a forward housing section 22 which is pivotally mounted with respect to the base housing section 14 about a pair of pivots (not shown). The forward housing section 22 is retained in its position as illustrated in FIGS. 1, 2 and 3 via a well-known latching arrangement (also not shown). When the latching arrangement is depressed, the forward housing section 22 releases for counterclockwise rotation (see FIG. 2) about its pivots to facilitate loading of the film cassette 26 into the film receiving chamber which is provided for that purpose in the base housing section 14. When in its latched position as illustrated in FIG. 2, the forward housing section 22 functions to retain the film cassette 26 within the base housing section 14 and also positions a pair of processing rollers 23 and 25 to sequentially transport and simultaneously process, in a well-known manner, the film units 28 after they have been exposed.

Shutter housing section 12 includes a forward wall 30 which normally faces the scene when the camera 10 is held in its normal picture taking attitude and a rear wall 32 which is spaced from the forward wall 30 and normally faces the photographer. The shutter housing 12 operates to provide a protective enclosure in which are disposed various components of the optical system and automatic exposure control system (not shown) for the camera 10.

Centrally disposed in the shutter housing forward wall 30 is an objective taking lens 34 which operates to direct image forming rays from the scene into the camera exposure chamber 24. The objective taking lens 34 is a well-known variable focus type whose focal length can be adjusted by changing the axial air spacing between its components. This is accomplished in a well-known manner by manually rotating a focusing wheel 27 (FIG. 1) or alternatively through the use of an automatic sonar focusing arrangement such as that described in U.S. patent application Ser. No. 840,802 filed Oct. 11, 1977.

A photometer, which is generally designated at 38, is also included in the shutter housing section 12 for purposes of evaluating the available scene light level and providing an output signal to the camera automatic exposure control system.

Located to the left of the objective taking lens 34 (see FIG. 1) is an actuator button 36 for initiating a photographic cycle for the camera 10.

Located in a top wall 39 of the shutter housing section 12 is a flash socket 40 for receiving an artificial light source (not shown). The flash socket 40 operates in cooperation with the camera automatic exposure control system to convert the camera automatic exposure control system from its ambient mode of operation into its flash exposure mode of operation in response to the insertion of the artificial light source into the flash socket 40.

Referring now to FIG. 2 wherein the camera 10 is illustrated in its viewing and focusing mode of operation, it can be seen that the optical system of the camera 10, in addition to the objective taking lens 34, comprises a reflex viewing mirror 46 which is fixedly attached to the rear housing section 18 and a Fresnelled opaque, reflective focusing screen 48 which is fixedly mounted to a carrier member 51 that is pivotably rotatable about a pivot 49. Also attached to the carrier member 51 is a reflex taking mirror 53 which overlies the exposure aperture 31 of film cassette 26 when the camera 10 is in its viewing and focusing mode. The carrier member 51 can be pivoted about the pivot 49 in a well-known manner for movement between its position illustrated in FIG. 2 to a position wherein the focusing screen 48 overlies the reflex viewing mirror 46 such that the reflex taking mirror 53 is in position to intercept rays emanating from the objective taking lens 34 to reflect them towards the film units 28.

When the camera 10 is in its viewing and focusing mode of operation, light rays from the scene are refracted by the objective taking lens 34 and reflected by the reflex viewing mirror 46 toward the opaque reflective focusing screen 48. Thus the objective lens 34 in combination with the reflex viewing screen 46 operates to form a real image of the subject on the focusing screen 48.

The focusing screen 48 operates to reflect at least some of the light that forms the real image therein back toward the reflex viewing mirror 46 at a location generally designated at 55. The light rays which strike the reflex viewing mirror 46 near the point 55 are reflected therefrom through an aperture 50, which is formed in the opaque envelope 20, and directed into a collapsible viewing device which is generally designated at 44.

The viewing device 44 comprises a concave mirror 52 which operates to form at a predetermined location an erect, unreverted rear aerial image of the focusing screen 48, and an eyelens 54 operates to magnify the real aerial image formed by the concave mirror 52.

Since the viewing device 44 operates to form a real aerial image of the focusing screen 48, and the scene imaged on the focusing screen 48 is the same as that subsequently included in the photograph, the sharpness of the image as seen in the viewing device 44 is a direct indication of the sharpness of the photographic image. In practice, the photographer observes the image formed by the viewing device 44 and, while observing that image, adjusts the focus of the objective taking lens in the manner previously described until the image that he sees is sharp. When this happens, the focus of the objective taking lens 34 will be properly adjusted for the particular scene of interest.

For a more detailed explanation of the various components which comprise the optical system of the camera 10, reference may be had to U.S. Pat. No. 3,783,764 issued to James G. Baker on Jan. 8, 1974 and entitled "Reflex Camera and Viewing Device" and to U.S. Pat. No. 3,836,931 issued to William T. Plummer on Sept. 17, 1974 and entitled "Eyelens in a Single Lens Reflex Camera Viewfinder Providing Field Tilt Compensation".

In the foregoing manner, the camera 10 is provided with optical means, including an eyelens 54 spaced rearwardly of the shutter housing section 12, for viewing the scene to be photographed.

The viewing device 44 is also configured in a well-known manner for movement between the extended operative position as illustrated in FIGS. 1, 2, and 3 and a compact folded position (not shown) which also facilitates transport and storage of the camera 10.

As can be seen from FIGS. 1, 2, and 3, the viewing device 44 additionally comprises a pair of spaced apart cantilevered members 66 (only one shown) having one end fixedly mounted to the upper housing section 16 while its free end extends rearwardly and upwardly with respect to the base housing section 14. Pivotally mounted to each of the cantilevered members 66 are a pair of spaced apart arms 56 and 58, respectively, each of which includes a slot 60 and 62, respectively. The slots, 60 and 62, are configured to slidably receive a pair of studs 61 and 63 respectively which extend outwardly from the base of the eyelens 54. The upper part of the eyelens 54 is pivotally mounted in the free end of the cantilevered member 66 via a pair of spaced apart pivots 65 (only one shown).

The concave mirror 52 is pivotally mounted adjacent the fixed end of the cantilevered members 66 via a pair of pivots 67 (only one shown) and to a pair of spaced apart slotted tab sections 68 (only one shown) which are fixedly mounted to a top cover member 74.

Arranged between the top cover member 74 and the camera top housing section 16 are telescoping blade members 72 which surround the concave mirror 52 to provide a dark chamber in which the concave mirror 52 forms the real image of the focusing screen 48. For a more detailed description and explanation of exactly how the foregoing viewing device erecting linkage arrangement operates reference may be had to U.S. Pat. No. 3,783,760 issued to Joseph H. Allen et al. on Jan. 8, 1974 and entitled "Collapsible Viewing Device" and to U.S. Pat. No. 3,833,914 issued to Joseph H. Allen on Sept. 3, 1974 and entitled "Folding Camera".

The present invention, as will be best understood from the description which follows, cooperates with various elements of the camera 10 described above to provide the camera 10 with apparatus by which a visual signal is provided in the field of view of the viewing device 44 indicating that the available scene light is below a threshold value which normally requires an artificial light source to illuminate the scene.

Referring now to FIG. 1, there can be seen an aperture 76 which is located in the shutter housing forward wall 30. The purpose of the aperture 76 is to provide an entrance into the shutter housing section 12 through which light from the scene can pass to impinge upon a photodetector which is located immediately behind the aperture 76 and which is designated at 78 in the circuit schematic of FIG. 4.

The photodetector 78 is preferably a silicon photodiode which has its cathode connected to the positive side of a battery 80 by closing a switch 82. The battery 80 is preferably that contained in the film cassette 26, and the switch 82 is a normally open switch which is mechanically coupled to the camera actuator button 36 in a well-known manner so that, when the user of the camera 10 depresses the actuator button 36, the switch 82 closes.

The output of the photodiode 78 is coupled in common with the input of a conventional operational amplifier 84 having a feedback resistor 86 associated therewith in a well-known manner to produce an output voltage proportional to the intensity of the scene brightness. The output of the operational amplifier 84 and its associated feedback resistor 86 serves as the input to a conventional level detector 88, such as the Schmitt trigger type. The level detector 88 is set to produce a high voltage output (logic 1) when the scene brightness is below a predetermined threshold value and a low voltage output (logic 0) when the scene brightness is above the predetermined threshold value.

Figure 4:
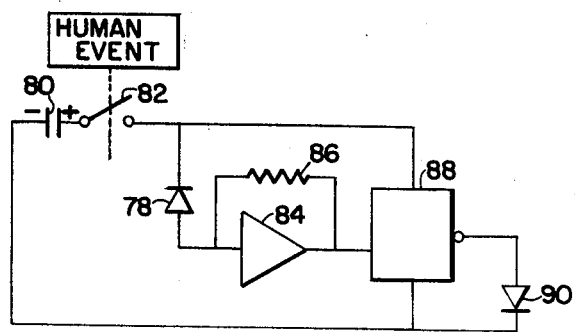
FIG. 4 is a schematic of a circuit which forms part of this invention.

A light emitting device in the form of a light emitting diode (LED) 90 is provided in the circuit of FIG. 4. The LED 90 has its cathode connected to the negative side of the battery 80 and its anode is connected in common with the output of the comparator 88. Connected in this manner, the LED 90 is biased on and off in response to the output of the comparator 88. When the scene brightness is below the predetermined threshold value, the output of the comparator 88 is high (logic 1) and the LED 90 is biased on, and when the scene brightness is above the predetermined threshold value, the output of the comparator is low (logic 0) thereby turning the LED 90 off.

As best seen in FIGS. 2 and 3, the LED 90 is mounted in the shutter housing section 12 generally behind the photodiode 78 and is arranged to provide its visual signal from the rear wall 32 of the shutter housing section 12.

The photodiode 78, the LED 90, and the other electrical components illustrated in the circuit of FIG. 4, excluding the switch 82 and the battery 80, are preferably formed as an integrated circuit chip to eliminate the need for extensive wiring between the photodiode 78 and the LED 90 and also to reduce the amount of space required to fit them into the shutter housing section 12.

In the foregoing manner, light detecting means are provided for measuring the level of available scene light and for providing a visual signal that the available scene light is below a threshold value which normally requires an artificial light source to illuminate the scene. The light detecting and signal providing means include the photodiode 78 and the LED 90 which is generally mounted behind the photodiode 78 and arranged to provide a visual signal, when it is biased on, from the shutter housing section rear wall 32.

As can best be seen from FIGS. 2 and 3, there is no direct line of sight between the LED 90 and the eyelens 54. However, a prismatic optical element 92, which is mounted on the viewing device arm 58 (see FIGS. 2 and 3), operates to provide a deviated optical path along which the signal provided by the LED 90 can be observed by a photographer through the eyelens 54 while viewing a scene to be photographed.

Figure 6:
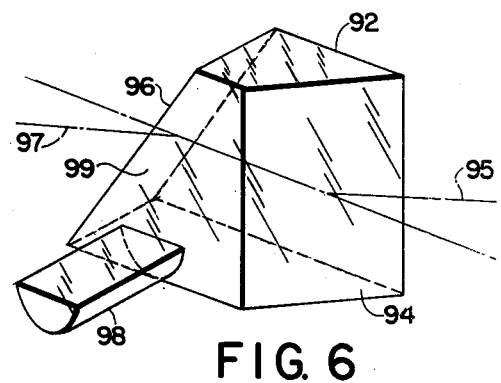
FIG. 6 is a perspective view of a prismatic optical element of the invention.

Referring to FIG. 6, it can be seen that the prismatic optical element 92 is an oblique quadrangular prism which is preferably formed of an optical plastic material and includes a first planar refracting surface 94 through which light from the LED 90 enters the prism 92 and a second planar refracting surface 96 from which light from the LED 90 exits the prismatic optical element 92.

The prismatic optical element 92 is provided with a stud 98 that is configured to be inserted through a correspondingly configured hole located in the viewing device arm 58. Structured in this manner, the stud 98 and corresponding hole for receiving it operate to provide a positive means by which the prismatic optical element 92 is properly oriented with respect to the eyelens 54 and the LED 90.

The prismatic optical element 92 is located on the viewing device arm 58 at a point which is intermediate the eyelens 54 and the LED 90 from which there is a direct line of sight to both the eyelens 54 and the LED 90.

Figure 5:
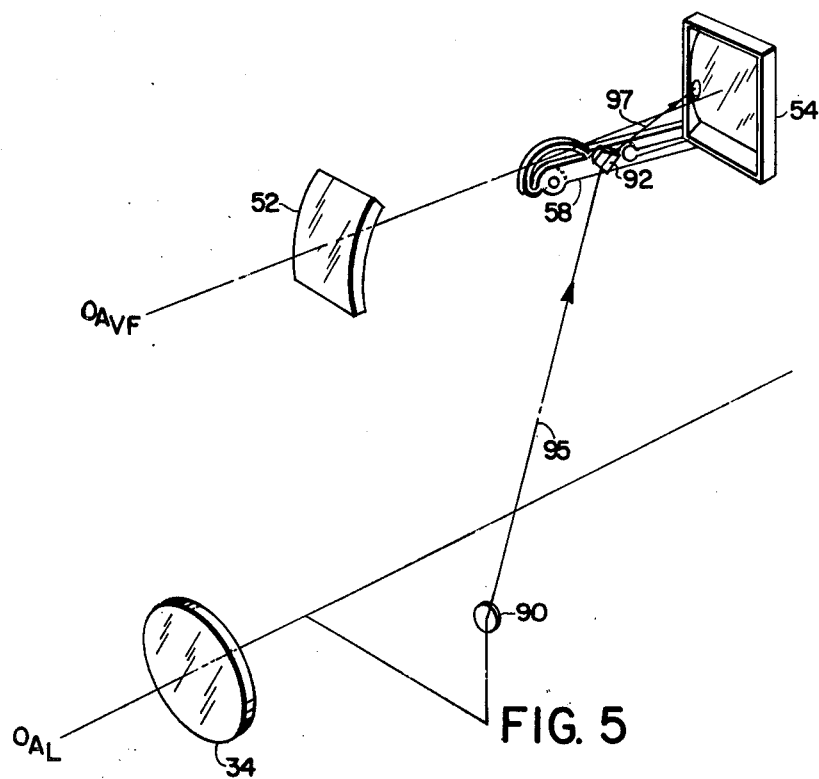
FIG. 5 is a diagrammatic perspective of part of this invention shown in combination with parts of the optical system of the camera of FIG. 1.

The direct line of sight from the prismatic optical element 92 to the LED is best illustrated by a ray 95 connecting the two as shown in FIGS. 3 and 5. The ray 95 passes through a rectangular cutout 93 which is located in the camera top housing section 16 and is centrally located just behind the concave reflecting mirror 52 (see FIGS. 2 and 3).

The direct line of sight from the prismatic optical element 92 to the eyelens 54 is best illustrated by a ray 97 as shown in FIGS. 2, 3 and 5.

Referring now to FIG. 5, it can be seen that the ray 95 leaves the LED 90 at an oblique angle traveling upwardly and to the left with respect to the optical axis $OA_L$ of the objective taking lens 34. The ray 95 then crosses the optical axis $OA_{VF}$ of the viewing device 44 and thereafter strikes the first refracting surface 94 of the prismatic optical element 92. The angle of the refracting surface 94 is chosen so that rays, such as that designated at 95, which strike the first refracting surface 94 are directed along a path which is substantially parallel to a face 99 of the prismatic optical element 92 (see FIG. 6). In this manner the thickness of the prismatic optical element 92 is minimized so that it does not occupy very much space across the width of the viewing device 44. The angle of the second planar refracting surface 96 is chosen so that the surface 96 deviates rays emerging from it in a direction which is generally down and toward the optical axis, $OA_{VF}$, of the viewing device 44 as can best be seen from FIGS. 2, 3, and 5.

As will be appreciated, the ray 95 is necessarily skewed with respect to the LED 90 and the prismatic optical element 92 since it must follow the line of sight which is available between the two. Likewise, the ray 97 from the prismatic optical element 92 to the right side of the eyelens 54 as illustrated in FIG. 3 is also skewed. Therefore, those skilled in the optical arts will recognize that the angles of the refracting surface 94 and 96 may be conveniently chosen by using the three dimensional law of refraction expressed in vector form. Since the direction of both the ray 95 and the ray 97 are known and the direction that a refracted ray takes traveling through the prismatic optical element 92 preferably is parallel to the prismatic optical element face 99, the angles at which the refracting surfaces 94 and 96 must be arranged are readily calculated by applying the three dimensional vector form of Snell's Law of Refraction at both refracting surfaces 94 and 96.

If, in similar applications, it is not necessary to minimize the thickness of the prismatic optical element 92, the direction in which a ray travels after having been refracted by the first refracting surface 95 can be selected to be not parallel with the prismatic optical element face 99.

For a concise explanation of the vector form of the law of refraction, reference may be had to Section 2.24 of the Military Standardization Handbook entitled "Optical Design" published on Oct. 5, 1962 (MIL-HDBK-141).

Those skilled in the art may make still other changes according to the teachings of the present invention. Therefore, it is intended that all matter contained in the above description or shown in the accompanying drawings shall be interpreted as illustrative and not in a limiting sense.

What is claimed is:

1. Photographic indicator apparatus for providing a visual signal to a photographer that available scene light is below a threshold value which normally requires an artificial light source to illuminate the scene, said apparatus comprising:

a camera housing including at least one section having a forward wall which generally faces the scene and a rear wall which generally faces the photographer when the camera is held in its normal picture taking attitude;

an objective taking lens centrally disposed in said forward wall of said one housing section for forming an image of a scene to be photographed;

light detecting means for measuring the level of available scene light and providing a visual signal that the available scene light is below a threshold value which normally requires an artificial light source to illuminate a scene, said light detecting and signal providing means including a photodetector mounted with respect to said forward wall of said one housing section and to one side of said objective taking lens and a light emitting device mounted generally behind said photodetector and arranged to provide said visual signal from said rear wall of said one housing section;

optical means, including an eyelens spaced rearwardly of said one housing section, for viewing the scene to be photographed, said eyelens and said light emitting device being configured and arranged with respect to one another so that there is a point intermediate said eyelens and said light emitting device from which there is a direct line of sight to both said eyelens and said light emitting device but so that no direct line of sight between said eyelens and said light emitting device exists, said intermediate point being remotely spaced from both said eyelens and said light emitting device; and a prismatic optical element mounted generally at said intermediate point, forward of said eyelens, and offset to one side of said eyelens optical axis which side is opposite to the side of said housing section adjacent which said light emitting device is positioned, said prismatic optical element being optically configured to receive light rays from said light emitting device and refract said received rays to provide a deviated optical path along which said visual light signal from said light emitting device can be observed by a photographer through said eyelens while viewing a scene to be photographed, said deviated optical path comprising one leg from said prismatic optical element to said light emitting device and another leg between said prismatic optical element and said eyelens, said prismatic optical element including a pair of spaced apart parallel non-refracting sides, a first planar refracting surface that is remote from said light emitting device and is arranged in a plane with respect to said one leg of said deviated optical path at an angle such that rays from said light emitting device which impinge on said first refracting surface are directed along a path that is substantially parallel to said spaced apart non-refracting sides so that the thickness of said prismatic optical element measured in a direction perpendicular to said eyelens optical axis is minimized, and a second planar refracting surface which deviates rays emerging therefrom in a direction generally toward said eyelens optical axis.

2. The apparatus of claim 1 wherein said prismatic optical element comprises an oblique quadrangular prism formed of an optical plastic material.

3. The apparatus of claim 1 wherein said light emitting device comprises a light emitting diode.

4. A photographic indicator apparatus for use with a reflex camera to provide a visual signal to a photographer that available scene light is below a threshold value that normally requires an artificial light source to illuminate the scene wherein the reflex camera is of the type including a housing having an opaque exposure chamber mounted within the housing and including a shutter housing section having a forward wall which generally faces the scene and a rear wall which generally faces the photographer when the camera is held in its normal picture taking attitude, an opaque focusing screen positioned in the exposure chamber, an objective taking lens mounted in the shutter housing section forward wall for forming an image of a scene, reflecting means positioned in the opaque exposure chamber for receiving scene light from the objective lens and reflecting it onto the opaque focusing screen to form thereon a real image of the scene and to intercept light emanating from the real image in the focusing screen to direct it along an optical path to the outside of the opaque exposure chamber and the camera housing, said apparatus comprising:

light detecting means for measuring the level of available scene light and providing a visual signal that the available scene light is below a predetermined threshold value that normally requires an artificial light source to illuminate the scene, said light detecting and signal providing means including a photodetector mounted with respect to the shutter housing section forward wall and to one side of the objective taking lens and a light emitting device mounted generally behind said photodetector so that, when actuated, its signal is visible on the shutter housing section rear wall;

a viewing device, including an eyelens, mounted on the exterior of the camera housing in position to intercept light traveling along the optical path from the interior of the opaque exposure chamber to the outside of the opaque exposure chamber and the camera housing and optically structured to form an erect, unreverted image of the scene formed on the opaque focusing screen, said eyelens being positioned with respect to said light emitting device so that there is a point within said viewing device intermediate said eyelens and said light emitting device from which there is a direct line of sight from said intermediate point to both said eyelens and said light emitting device but so that no direct line of sight between the said eyelens and said light emitting device exists, said intermediate point also being remotely spaced from both said eyelens and said light emitting device, said viewing device being further configured and arranged with respect to the camera housing for movement between a compact collapsed inoperative position and an extended operative position and including an erecting linkage arrangement which includes two primary spaced apart elongated links fixedly mounted to the camera housing and longitudinally extending in a direction generally from the front to the rear of the camera wherein said intermediate point is located on one of said elongated links; and a prismatic optical element fixedly attached to said one elongated link proximate said intermediate point and mounted within said viewing device for providing a deviated optical path along which said light emitting device visual signal can be observed by a photographer through said eyelens while viewing a scene to be photographed, said prismatic optical element being optically configured to receive light rays from said light emitting device and refract said received rays to provide said deviated optical path, said deviated optical path comprising one leg from said prismatic optical element to said light emitting device and another leg between said prismatic optical element and said eyelens, said prismatic optical element including a pair of spaced apart non-refracting sides, a first planar refracting surface that is remote from said light emitting device and is arranged in a plane with respect to said one leg of said deviated optical path at an angle such that rays from said light emitting device which impinge on said first refracting surface are directed along a path that is substantially parallel to said non-refracting sides so that the thickness of said prismatic optical element measured in a direction perpendicular to said eyelens optical axis is minimized, and a second planar refracting surface which deviates rays emerging therefrom in a direction generally toward said eyelens optical axis.

5. The apparatus of claim 4 wherein said viewing device is further configured and arranged with respect to the camera housing for movement between a compact collapsed inoperative position and an extended operative position.

6. The apparatus of claim 5 wherein said viewing device includes an erecting linkage arrangement including two primary spaced apart elongated links fixedly mounted to the camera housing and longitudinally extending in a direction generally from the front to the rear of the camera wherein said intermediate point is located on one of said elongated links and wherein said prismatic optical element is fixedly attached to said one elongated link proximate said intermediate point.

7. The apparatus of claim 4 wherein said prismatic optical element comprises an oblique quadrangular prism formed of an optical plastic material.

8. The apparatus of claim 4 wherein said light emitting device comprises a light emitting diode.

9. In a reflex camera having a viewing device, including an eyelens, by which an erect, unreverted image of a scene can be viewed through the viewing device eyelens via the camera's objective lens and which also includes means by which a visual signal indicating the presence of a low available light condition is displayed outside the field of the eyelens so that it is not visible therethrough but is visible from a position in the viewing device which is remotely spaced from the eyelens and the location of the visual signal, which is intermediate the eyelens and the location of the visual signal, and from which there is a direct line of sight to both the eyelens and the visual signal, the improvement comprising:

a prismatic optical element mounted generally at said intermediate point, forward of said eyelens, and offset to one side of said eyelens optical axis, said prismatic optical element being optically configured to receive light rays from said light emitting device and refract said received rays to provide a deviated optical path along which said visual light signal from said light emitting device can be observed by a photographer through said eyelens while viewing a scene to be photographed, said deviated optical path comprising one leg from said prismatic optical element to said light emitting device and another leg between said prismatic optical element and said eyelens, said prismatic optical element including a pair of spaced apart parallel non-refracting sides, a first planar refracting surface that is remote from said light emitting device and is arranged in a plane with respect to said one leg of said deviated optical path at an angle such that rays from said light emitting device which impinge on said first refracting surface are directed along a path that is substantially parallel to said non-refracting sides so that the thickness of said prismatic optical element measured in a direction perpendicular to said eyelens optical axis is minimized, and a second planar refracting surface which deviates rays emerging therefrom in a direction generally toward said eyelens optical axis.

10. the prismatic optical element of claim 9 further optically structured so that the visual signal appears to one side of the eyelens field.

11. The apparatus of claim 10 wherein said prismatic optical element comprises an oblique quadrangular prism formed of an optical plastic material.

* * * * *